United States Patent [19]

Price et al.

[11] Patent Number: 4,793,985

[45] Date of Patent: Dec. 27, 1988

[54] METHOD OF PRODUCING ULTRAFINE GROUND CALCIUM CARBONATE

[75] Inventors: Charles R. Price; Frank R. Trowbridge; Albert C. Kunkle, all of Macon, Ga.

[73] Assignee: J. M. Huber Corporation, Locust, N.J.

[21] Appl. No.: 570,105

[22] Filed: Jan. 12, 1984

Related U.S. Application Data

[63] Continuation of Ser. No. 410,794, Aug. 23, 1982, abandoned, which is a continuation of Ser. No. 229,475, Jan. 29, 1981, abandoned, which is a continuation-in-part of Ser. No. 61,148, Jul. 27, 1979, abandoned.

[51] Int. Cl.$^4$ ........................ C01F 5/24; C01F 11/18; C04B 14/28; C09C 1/02
[52] U.S. Cl. ..................................... 423/430; 106/465
[58] Field of Search ..................... 423/430, 431, 432; 106/306

[56] References Cited

U.S. PATENT DOCUMENTS

| | | | |
|---|---|---|---|
| 2,260,826 | 10/1941 | Booge | 106/306 |
| 3,309,030 | 3/1976 | Molls et al. | 241/134 |
| 3,797,610 | 3/1974 | Windle | 106/306 |
| 4,166,582 | 9/1979 | Falcon-Steward | 241/16 |
| 4,251,351 | 2/1981 | Bowman | 423/430 |

FOREIGN PATENT DOCUMENTS

| | | | |
|---|---|---|---|
| 1069276 | 5/1967 | United Kingdom | 423/430 |
| 1215556 | 12/1970 | United Kingdom | 423/430 |
| 1285891 | 8/1972 | United Kingdom | 423/430 |
| 1309074 | 3/1973 | United Kingdom | 106/306 |

*Primary Examiner*—Gary P. Straub
*Attorney, Agent, or Firm*—Robert L. Price; Harold H. Flanders; Alec H. Horn

[57] ABSTRACT

A process for producing ultrafine ground calcium carbonate is disclosed in which a dry feed stone is slurried to a 15 to 60% by weight solids slurry and dispersed with an organic dispersant. The dispersed slurry is fed to an attrition mill where it is bead ground to 50-70% less than 2 microns. The ground calcium carbonate is classified in a centrifuge into a product stream having from 70-99% of its particles less than 2 microns and an underflow stream of larger particles. The product stream is treated with ozone which serves not only to increase the brightness of the product but to return the slurry to a non-dispersed state. The calcium carbonate slurry is then dewatered to produce a 58-69% solids product suitable for preparing a higher solids slurry or for spray drying.

8 Claims, 4 Drawing Sheets

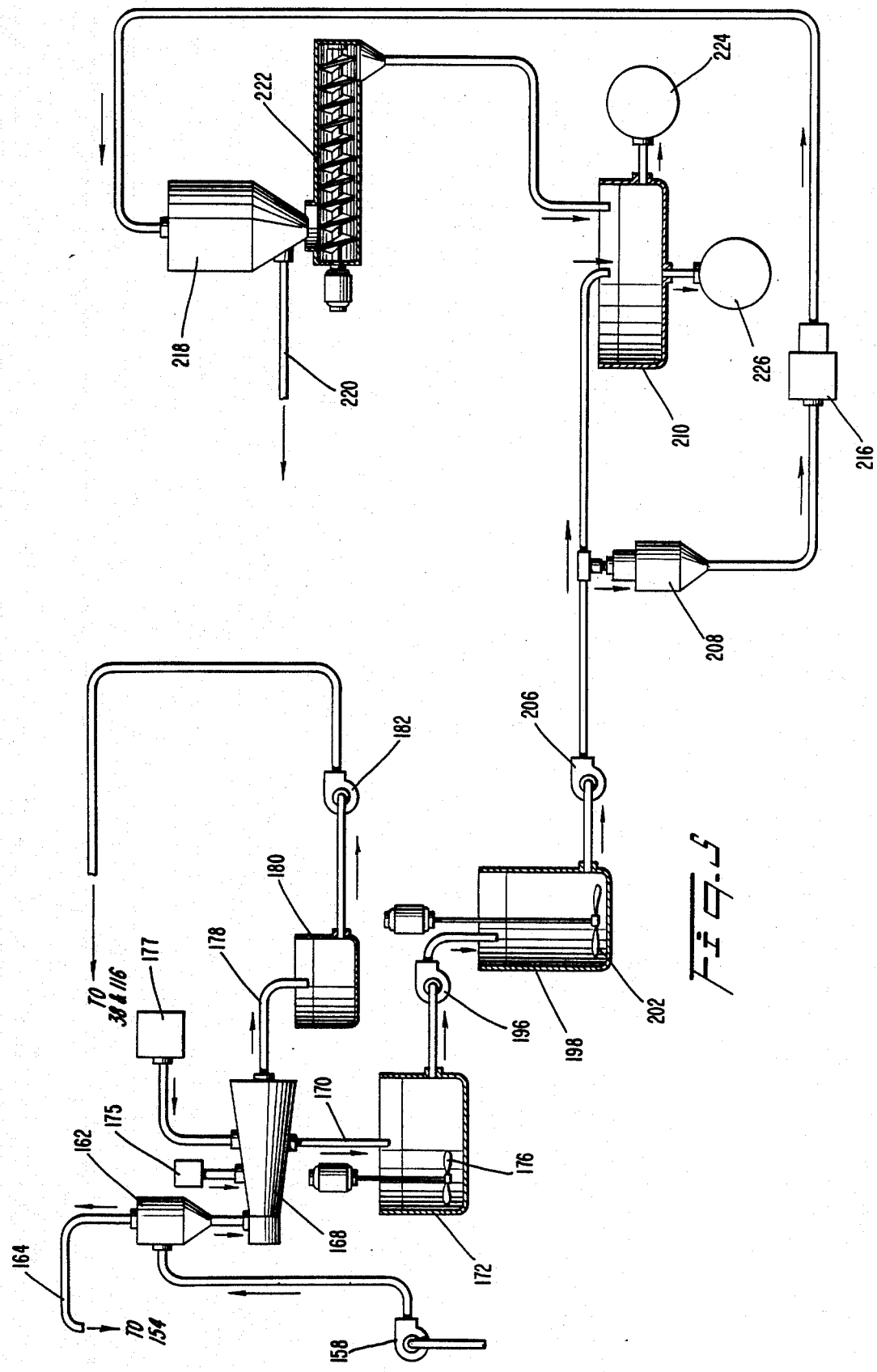

METHOD OF PRODUCING ULTRAFINE GROUND CALCIUM CARBONATE

CROSS REFERENCE TO RELATED APPLICATIONS

This is a continuation-in-part of Ser. No. 410,794, filed Aug. 23, 1982, which is a continuation of Ser. No. 229,475, filed Jan. 29, 1981, which is a continuation-in-part of Ser. No. 61,148, filed July 27, 1979, all now abandoned.

TECHNICAL FIELD

The present invention relates to calcium carbonate and in particular to a method of producing ultrafine ground calcium carbonate which is suitable for coating paper.

BACKGROUND ART

The prior art in this area has suffered from the lack of an energy efficient process for producing ultrafine ground calcium carbonate. Further, a great deal of difficulty has been experienced in producing a suitable product capable of being spray dried and producing an easily dispersed pellet or bead.

The prior art teaches the employment of a dispersing chemical to enable calcium carbonate to be ground to a finer particle size than is possible in a non-dispersed system. Much of the prior art teaches the use of dispersants such as glassy phosphate which is slowly reactive with calcium carbonate. The reaction tends to produce calcium phosphate and/or calcium biphosphate which causes reagglomeration of the fine calcite particles into hard-to-disperse coarse particles which are unsuitable for coating paper.

The prior art also teaches processes depending on a coagulating chemical such as aluminum sulfate or calcium chloride for dewatering. The aluminum sulfate is slowly reactive with calcium carbonate thus forming an aluminum hydrate pigment which may promote reagglomeration of the fine particles. The residual sulfate ions increase the viscosity of the finished product and cause an increased demand for dispersing chemicals. The calcium chloride used for coagulation purposes does not produce the state of flocculation provided by alum and it releases residual chloride ions to the calcium carbonate which can result in higher viscosities and higher dispersant demands.

The additional problem related to the prior art is the tendency to ignore otherwise suitable deposits of calcium carbonate as the raw material for an ultrafine ground calcium carbonate product because of the lack of effective leaching techniques applicable to calcium carbonate as found in its various natural states.

Methods are known in the prior art for treatment of calcium carbonate-type materials to improve their characteristics. Thus, U.S. Pat. No. 4,165,840 to Lewis et al describes a method for processing calcitic ores to produce a finely divided calcium carbonate of high brightness characteristics by initially coarse-milling to produce a product where no more than 5% by weight of the particulate is +325 mesh, and no more than 35% by weight of the particles are less than 2 microns in size. This coarse-milled product is then subjected as a slurry to froth flotation with the purified underflow then being dewatered to at least 60% solids by weight and then wet-milled as in a sandmill to yield an output product wherein at least 80% of the particulate is a size of less than 2 microns.

U.S. Pat. No. 3,661,610 teaches a similar process to produce a mixed pigment comprising clay and calcium carbonate by a method comprising forming an aqueous suspension of the clay containing a first dispersing agent which is a water soluble phosphate, and a second dispersing agent which is a water-soluble salt of an organic macromolecular anion, forming an aqueous suspension of the calcium carbonate pigment and then blending the two solutions.

British Patent No. 1,285,891 discloses methods for improving the brightness of alkaline earth metal carbonates such as calcium carbonate by treating the carbonates at 20°-100°C. with either a halogen, an oxygen containing acid of a halogen, or a salt of such an acid, ozone or hydrogen peroxide. Thus, this patent discloses methods for brightening calcium carbonate by contact with a brightening agent such as ozone.

SUMMARY OF THE INVENTION

Accordingly, it is an object of the present invention to provide a new, energy efficient, and highly effective process which overcomes the deficiencies of the prior art as described above.

It is a further object of the present invention to provide a process resulting in effective calcium carbonate particle size reduction with relatively low energy consumption.

An additional object of the present invention is to provide a process capable of producing a dewatered product of desired particle size distribution in an energy efficient manner.

Other objects and a fuller understanding of the present invention may be had by referring to the following descriptions and claims taken in conjunction with the accompanying drawings.

In satisfaction of the foregoing objects and advantages, there is provided by this invention a process for producing ultrafine ground calcium carbonate having characteristics which make it eminently suitable for coating paper, the process comprising the steps of:

(a) providing a dry crushed calcium carbonate to be slurried;

(b) slurrying said calcium carbonate in a slurry tank to produce about 15 to 60% by weight solids slurry;

(c) dispersing said slurry by adding a dispersion thereto;

(d) bead grinding said dispersed slurry in an attrition mill containing about 40-60% by volume of beads for a sufficient time for the output product of said attrition mill to comprise particles of calcium carbonate having a size of from 50-70% by weight less than 2 microns;

(e) classifying the output product of said attrition mill into a product stream having from 70-99% by weight of its particles less than 2 microns and an underflow stream of predominantly larger particles;

(f) contacting said output product with ozone in sufficient amount and for a sufficient time to (1) brighten said calcium carbonate product, (2) destroy any dispersant contained in the mixture, (3) destroy any flocculent contained in the mixture, and (4) destroy any organic matter or microorganisms contained in the mixture; and (G) dewatering the products resulting from treatment with the ozone to produce a calcium carbonate having a solids content of about 58-69 weight percent.

The present invention overcomes the deficiencies of the prior art and achieves its objectives by providing a dry food stone slurried to a 15 to 60% by weight solids slurry and dispersed with an organic dispersant. The dispersed slurry is fed to an attrition mill where it is bead ground to 50-70% less than 2 microns. The ground calcium carbonate is classified in a centrifuge into a product stream having from 70-99% of its particles less than 2 microns. The product stream is leached by treatment with ozone which serves not only to increase the brightness of the product but to return the slurry to a non-dispersed state. The calcium carbonate slurry is then dewatered to produce a 65-69% solids product suitable for producing a high solids slurry or for spray drying.

The passage of material through the attrition mill on a continuous basis dependent on the input flow rate followed by classification in a centrifuge and recycling of the coarse fraction significantly reduces the energy required for effective particle size reduction. This process also prevents overgrinding of the material and/or the production of excessive fines and the wasting of energy associated therewith.

The process also provides an easily controlled method of shifting the average particle size and the particle size distribution within wide limits for a given calcium carbonate.

The ability of the recycle process to provide tailoring of the product particle size and particle size distribution while employing the minimum energy to produce a given product is a significant advantage of the present invention.

BRIEF DESCRIPTION OF THE DRAWINGS

In order to facilitate the understanding of the present invention, reference will now be made to the appended drawings of a preferred embodiment of the present invention. The drawings should not be construed as limiting the present invention, but are exemplary only.

FIGS. 3 through 5 in sequence constitute an expanded and more detailed representation of the process for producing ultrafine ground calcium carbonate employing and in accordance with the present invention in which:

FIG. 3 represents the makedown, attrition and classification steps;

FIG. 4 represents the leaching process; and

FIG. 5 represents the dewatering process and the subsequent disposition of the product.

Figure 1:
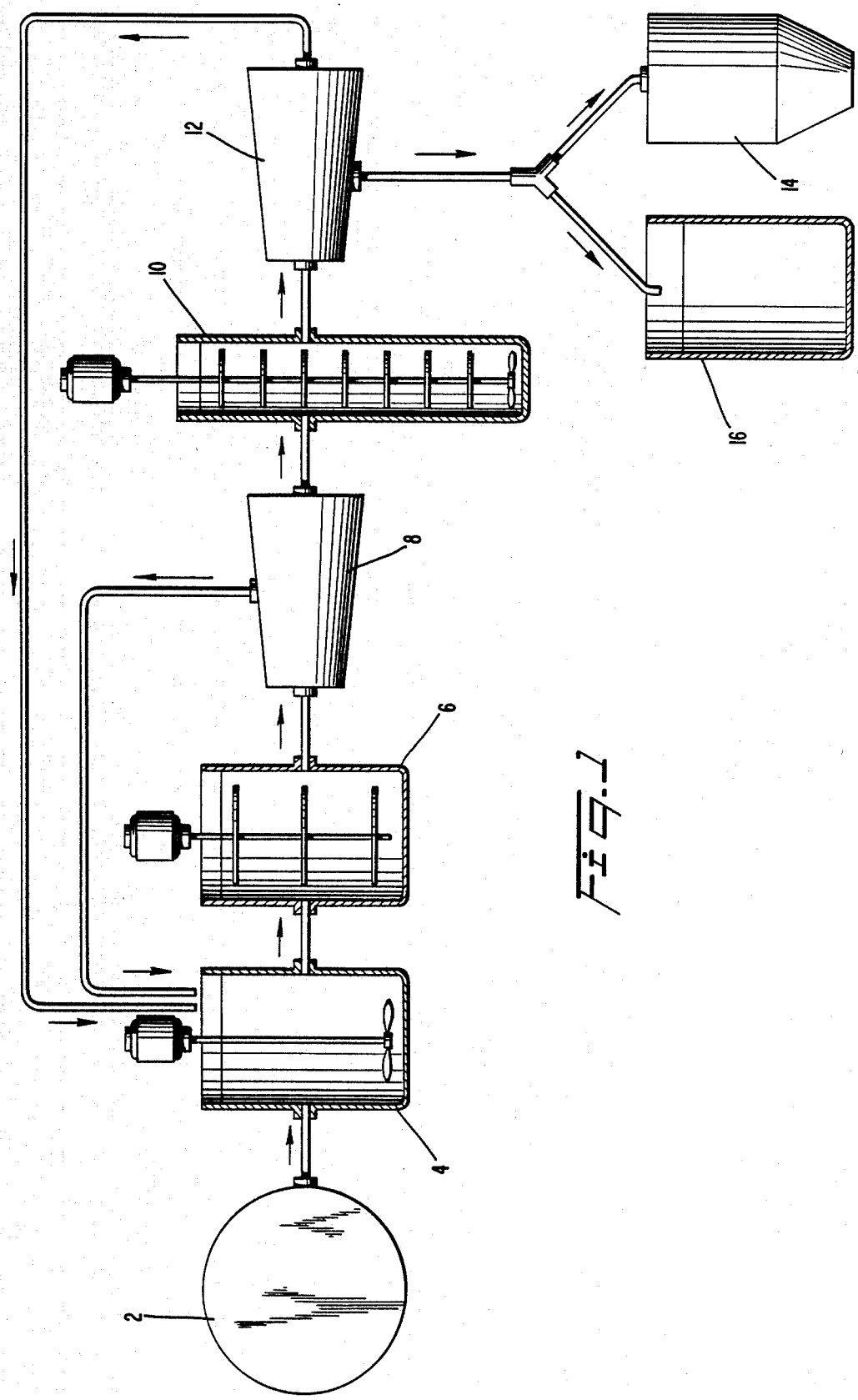
FIG. 1 is a summary flow sheet of a process for producing ultrafine ground calcium carbonate employing and in accordance with the present invention.

In the process of the present invention, the starting material is a calcium carbonate, commonly called limestone. Limestone is a well known naturallyoccurring material including such calcium carbonates as dolimite, whiting, chalk and other forms of calcium carbonate. Limestone is defined in the "Glossary of Geology" by Gary et al, published by the "American Geological Institute", Washington, D. C. as being a sedimentary rock consisting chiefly, that is, more than 50% by weight, of calcium carbonate primarily in the form of the mineral calcite and with or without magnesium carbonate. Thus, in the present invention, the term calcium carbonate or limestone is considered to be inclusive of all types of materials which contain sufficient calcium carbonate to be operable in the process of the invention.

The calcium carbonate is normally obtained as a coarse product which in accordance with the present invention requires grinding to be suitable for incorporation into the process of this invention. It is preferred that the calcium carbonate be ground to the extent that about 99.5-99.9 weight per cent of the mixture be at least in the range of −325 mesh or less than about 45 microns. However, the ground calcium carbonate is still operable even if significant proportions are coarser grade materials.

The ground calcium carbonate is then slurried with water, either fresh water and/or recycle liquids as described hereinafter, to obtain about a 30% slurry of calcium carbonate solids in water. This slurry is then transferred to a feedtank or makedown tank where dispersant is added to the slurry. The dispersant is added at this point to improve distribution of the solids within the liquids. The dispersant is added in an amount of 0.2-0.4 weight per cent based on 100% active dispersant. Since many dispersants are not 100% active, this factor must be taken into consideration. Preferred dispersants comprise the class of dispersants sold commercially as polyacrylates with the preferred material being sodium polyacrylate. This material is preferably added in an amount of about 0.16% by weight of the solids present since the polyacrylate is only about 40% active.

After the dispersant is added to the slurry and good distribution is obtained, the mixture is transferred to an attrition mill such as a Denver Bead Mill to condition the calcium carbonate material. The attrition mill will contain beads having a size of about 8 up to 50 mesh and in a volume of about 40-60%. Each mill should be provided with sufficient grinding capacity to introduce energy in the range of about 110-150 horsepower per ton. The grinding in the attrition mill is continued for about 5-60 minutes to complete conditioning of the calcium carbonate at this stage.

The conditioned calcium carbonate is then removed from the attrition mill through a screen which is about an 80-150 mesh screen so that the beads and large particles are retained in the bead mill for additional grinding. The effluent or output product passes through the screen and preferably through a second 80-150 mesh screen. This output product is then pumped to a classifier centrifuge for classification between large and small particles. Sufficient steam is preferably added to bring the mixture to a temperature of about 140° F. Obviously, other methods of heating to this temperature could also be employed at this stage.

The product removed from the classifying centrifuge will contain particles of which about 75% are smaller than 2 microns. Preferably, up to about 90% are smaller than about 2 microns. The latter preferred embodiment would, of course, require additional grinding energy in the attrition mill so that it is preferred that sufficient grinding in the grinding stage and in the attrition mill be carried out so that at the classifying centrifuge stage, at least 75% of the particles are smaller than about 2 microns.

The larger particles from the classifier centrifuge are recycled to the makedown tank for redispersing and additional grinding. In general, the effluent removes the fine particle solids as product with the remainder being recycled to the makedown tank for requiring. THus, by the process of recycle, eventually all particles will be of correct size. It has been found in practical operation that the effluent will contain about 40-60 weight percent of the solids, preferably 50 weight percent, and the recycle will contain the remaining 60-40 weight percent of the solids, preferably about 50 weight percent. A significant advantage is achieved in recycling about 60-40 weight percent of the solids rather than attempting to grind all solids to small particle size in one pass. It has been found that use of recycle enables grinding to the small particle size to be achieved using reduced amounts of energy, and it also improves distribution of the particles so that more particles are obtained at a size of less than about 2 microns.

The effluent or output product is then removed and pumped to a contact tower for contact with ozone to oxidize and brighten the calcium carbonate. In the contact tower the ozone achieves a number of advantages. Thus, the ozone serves to brighten the calcium carbonate to make it more suitable for use as a coating or filler for paper and the like. Additionally, contact with the ozone destroys any dispersant remaining in the effluent as well as any flocculent which may be present. The ozone also serves to destroy organic matter or microorganisms which may be contained in the calcium carbonate material.

The ozone is preferably added in sufficient amounts to provide about 3 to 10 pounds of ozone per ton of solids. Ozone, alone or in admixture with oxygen, and/or nitrogen, is preferred. In a preferred embodiment, about 3-5 weight percent of the ozone gas will be added per ton of the calcium carbonate solids. The contact time of the solids with the ozone in the contact column is in the range of about 15 minutes to 1 hour, preferably about ½ hour. The resulting mixture comes a self-suspending sol as it is removed from the contact column.

This sol is then removed to a dewatering centrifuge which comprises two tanks run at higher speeds than the classifying centrifuge so that the work input is more severe. It is preferred to add steam or the like to achieve a temperature in the range of about 160° F. for better separation. In this centrifuge a separation is made between the liquids and the product. The liquids are recycled to the makedown tank for reuse in the process and will obviously contain some product for recycle. The product will comprise about 58-59 weight percent solids product although this can be increased up to 70 weight percent.

It is preferred to add a flocculent at the mouth of the centrifuge to increase brightness, increase capacity and the like. The preferred flocculent is a medium anionic flocculent such as Hercules Hercofloc 103D.

After flocculation of the mixture in the centrifuge it is also preferred to again add a small amount of dispersant to thin the mixture so that it can pass through the screw of the centrifuge for economical operation.

The resulting product is then removed to a high solids tank for storage as desired. From storage, the product can then be treated by either spray drying to provide a dry product or made up to 70% solids by adding spray-dried material to lower solids material.

The resulting product will be found to have a brightness of the order of about 9 and a particle size wherein up to about 90% of the particles are less than about 2 microns, and 0-10% of the particles are less than about 5 microns under the Stokes diameter measuring system.

DESCRIPTION OF THE PREFERRED EMBODIMENT

A preferred embodiment of the present invention is shown in summary in FIG. 1.

Figure 2:
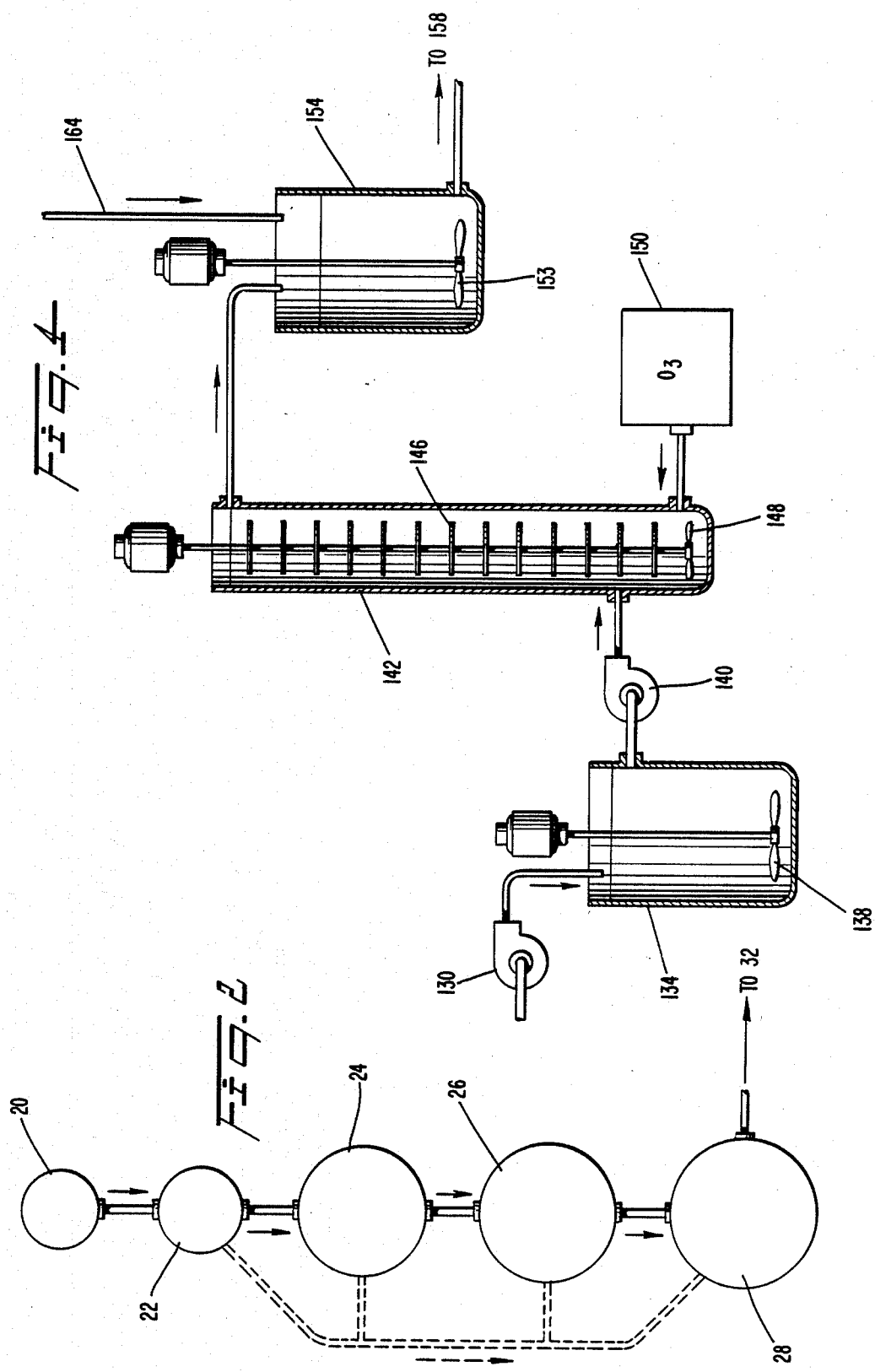
FIG. 2 is a flow sheet illustrating the processing of the raw material for the present invention.

Dry ground feed stone 2, produced in accordance with conventional processing as described in and with regard to FIG. 2, is slurried to a 15 to 60% by weight solids slurry in makedown tank 4, preferably with agitation as shown. A 30 weight percent slurry is preferred for optimum results. The slurry is then dispersed with an oxidizable, organic dispersant by adding the dispersant either to the tank 4 or to the line leaving the tank.

This slurry is fed to a bead mill such as a Denver Attrition Mill(s) 6 containing from 40 to 60% by volume of glass beads of 8 to 50 mesh diameter. The residence time of the slurry within the Denver Attrition Mill(s) is on the order of from 5 to 60 minutes. The amount of grinding energy introduced into the bead mill is preferably about 110 to 150 HP/ton. The product is continuously discharged from the attrition mill(s) 6 through at least one screen of about 80 to 150 mesh to retain large particles and is fed into a classifying centrifuge 8.

The classifying centrifuge 8 separates the product from the attrition mill 6 which typically has from 50-70% of its particles less than 2 microns, 8-12% greater than 5 microns and 2-4% greater than 10 microns into a product steam having from 70-99% of its particles less than 2 microns with no particles in excess of 10 microns and less than 5% of its particles greater than 5 microns, and an underflow stream consisting predominantly of the larger particles with no more than 15 to 30% of its particles less than 2 microns. The centrifuge 8 is heated as with steam to about 140° F. for best results.

The underflow stream is recycled to makedown tank 4 and thereafter reprocessed. This recycle of the underflow is a significant feature of the invention as it provides a method for control of particle size of the product by regrinding larger particles to provide ultimate particle size uniformity. Recycle also reduces the amount of energy required to grind the process.

In this embodiment the product stream is then leached with at least 1½ pounds of ozone per ton of dry calcium carbonate in contact column 10 to increase its brightness. The ozone or other oxidation agent also decomposes or destroys the organic dispersant present in column 10, thus returning the calcium carbonate to a non-dispersed state. The oxidation agent also destroys any flocculent present as well as any organic matter and/or microorganisms.

The calcium carbonate product stream having a solids content on the order of 20% removed from the column is fed to dewatering centrifuge 12 which dewaters the product stream to a 65 to 69% solids product. After redispersing, the product may be spray dried in spray dryer 14 or slurried in a high solids makedown tank 16.

The overflow effluent stream from the dewatering centrifuge may be returned to makedown tank 4 or employed at other points within the process as hereinafter described.

The major unit operations described in the above outline of the overall process, of course, correspond to the like elements as described hereinafter in detail. In particular, the dry ground feed stone 2 corresponds to that produced by the process of FIG. 2. Makedown tank 4 corresponds to makedown tank 38 of FIG. 3. The Denver Attrition Mill 6 corresponds to the attrition mill 62 of FIG. 3. Classifying centrifuge 8 corresponds to centrifuge 102 of FIG. 3. Ozonization column 10 corresponds to column 142 of FIG. 4. Dewatering centrifuge 12 corresponds to centrifuge 168 of FIG. 5. Spray dryer 14 corresponds to spray dryer 208 of FIG. 5. High solids makedown tank 16 corresponds to makedown tank 210 of FIG. 5.

Turning now to the process in detail, it should be noted as illustrated in FIG. 2 that a limestone is typically quarried at 20 and crushed in a primary crusher 22. Optionally, the crushed limestone may be passed through a washer 24 or a picker 26 or both, and may then be subjected to further crushing in a secondary crusher 28 to produce the dry feed stone which is the starting material of the present invention. This material is typically dry ground so that 90% by weight of its particles are less than 44 microns and 10% by weight are less than 2 microns.

Figure 3:
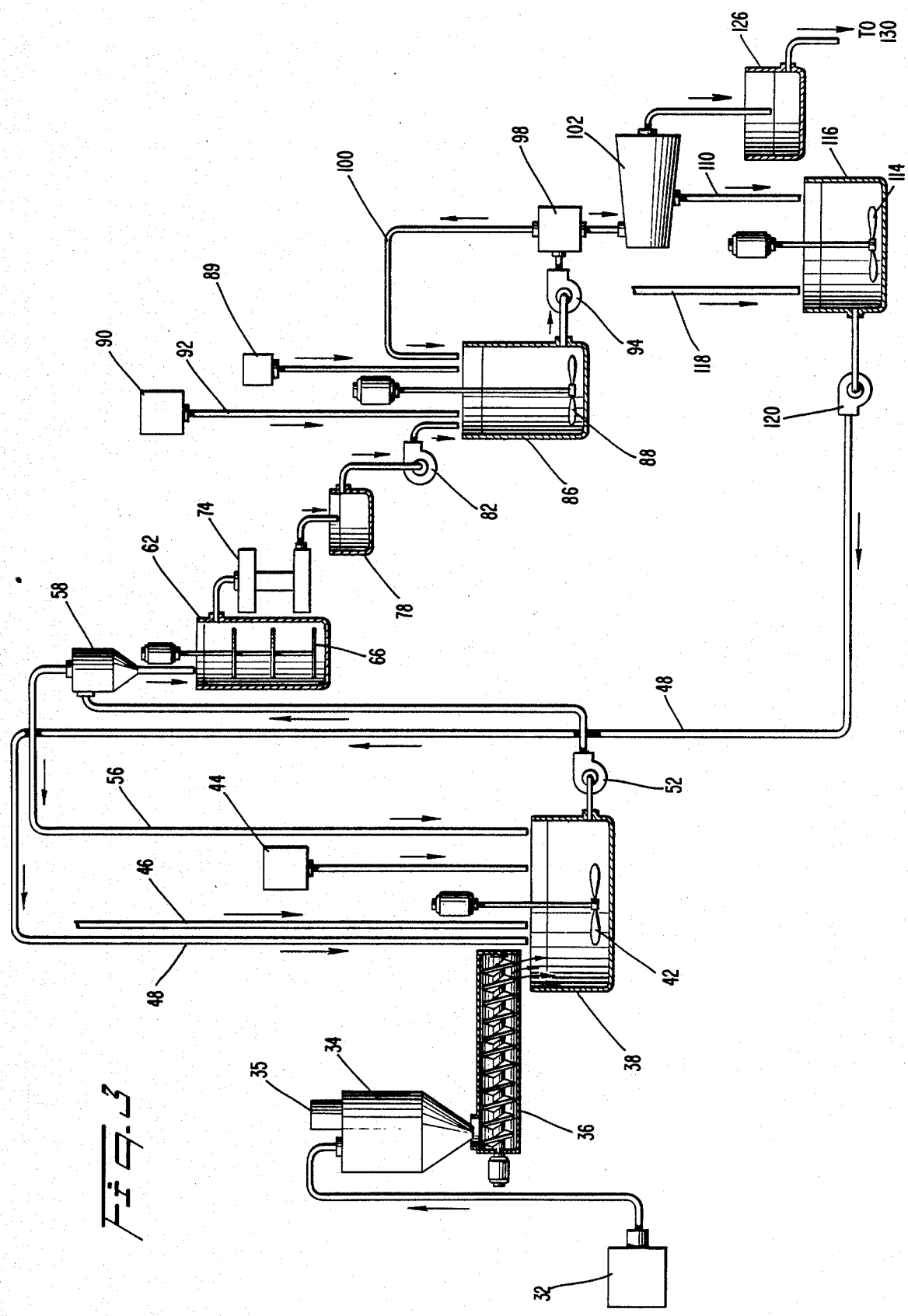

As shown in FIG. 3, the dry feed stone may be pumped by a Fuller-Kinyon or air conveying pump 32, or similar conventional apparatus, into a coarse dry ground feed storage tank 34, preferably equipped with suitable dust collection means 35.

When desired, the coarse dry ground feed material may be removed from storage tank 34 by means of screw conveyor 36 and added to makedown tank 38 where it is mixed with water (and/or recycle effluent from the dewatering centrifuge as hereinafter described) from water/recycled effluent feed 46 by means of motor powered impeller 42.

The water (or effluent) is added in an amount so as to produce a slurry on the order of 15 to 60% by weight of solids.

Simultaneously with makedown or thereafter, a dispersant is added by means of dispersant feed 44. While any suitable dispersant may be employed including the conventional and known dispersants, in order to take full advantage of all aspects of the present invention, it is preferred that the dispersant be an organic dispersant susceptible to being oxidized or otherwise decomposed or rendered non-dispersing by the leaching with ozone or other oxidation agent step as hereinafter described. Typical of such organic dispersants is DISPEX N40 which is a polyacrylate dispersant produced by Allied Coloid, Inc. ALCOSPERSE 149, D-FLOC 150 and COLLOIDS 211 are the trade names of other suitable organic dispersants. Many other macromolecular dispersing agents may also be suitably employed.

The amount of the dispersant added is typically on the order of 0.2% to 0.4% on a dry weight basis.

The feed slurry is typically retained in the makedown tank 38 for a period of time on the order of 10 minutes under agitation by the mixer. The amount of work applied during this period is generally indicated by employing a tip speed for impeller 42 on the order of 1000 to 1500 feet per minute.

The output of the makedown tank 38 is pumped by means of centrifugal pump 52 so that the output of the pump 52 may be fed to a constant head feed tank 58.

The overflow 56 of the constant head feed tank 58 is fed back to the makedown tank 38.

The flow from the constant head feed tank 58 is fed into one or more Denver Attrition Mills 62, or other suitable attrition mills or scrubbers, which may contain approximately 40 to 60% by volume of glass or ceramic heads of 8 to 50 mesh bead size. The remaining volume consists of the pigment slurry at the specified solids concentration. The grinding of the calcium carbonate is controlled by providing input flow rate such that the retention time within the attrition mill is on the order of from 5 to 60 minutes with power applied by impellers 66 on the order of 100–150 HP per ton of calcium carbonate so that the discharge of the attrition mill 62 is continuously providing a product having from 50 to 70% by weight of the particles less than 2 microns.

The beads are retained in attrition mill 62 by appropriate mesh screens.

The output of the attrition mill 62 is screened by screen 74 which may be 80–150 mesh screens to remove any trash present.

The slurry passing through screen 74 is passed to surge tank 78. The output of surge tank 78 is pumped by centrifugal pump 82 to the centrifuge feed tank 86 where it is further mixed by motor driven impellers 88.

Additional dispersant (up to about 0.05% by weight on an active, dry basis) may, optionally, be added by means of dispersant feeder 89 in the centrifuge feed tank 86, if desired.

The slurry may be heated to about 140° F. by steam feed to the centrifuge feed tank by steam feed 92 from steam generator 90.

The output of the centrifuge feed tank 86 is pumped by centrifugal pump 94 to constant head feed tank 98. Overflow 100 from constant head feed tank 98 is returned to the centrifuge feed tank 86. The slurry is fed from constant head feed tank 98 to centrifuge 102. The centrifuge 102 may be, for example, a DeLaval Solid Bowl Decantor NX 418 or any similar centrifuge which may be operated at 1600 G's, at approximately 15 HP-HR per ton of dry calcium carbonate or less.

The slurry going into the centrifuge 102 has a particle size distribution which includes 50–70% of the particles being less than 2 microns, 8–12% greater than 5 microns and 2–4% greater than 10 microns.

The product coming out of the centrifuge 102 has 70–90%, and preferably 70–99%, of its particles less than 2 microns in size with no particles in excess of 10 microns and less than 5% of its particles greater than 5 microns.

The underflow 110 contains not more than 15–30% of its particles less than 2 microns and preferably not more than 18–25% less than 2 microns. The underflow 110 is collected in the centrifuge underflow tank 116 where it is mixed by motor driven impeller 114. Additional water and/or effluent (from the dewatering centrifuge as hereinafter described) is added to this underflow 110 by water/effluent feed 118 so that it may be pumped by centrifugal pump 120 and recirculated as all or a part of stream 48 back to the crude slurry makedown tank 38. In the makedown tank 38, the recycled calcium carbonate underflow consisting predominantly of larger particles with less than approximately 18 to 25% of its particles less than 2 microns is mixed by mild agitation in the ratio of approximately one part recycled material with three parts raw material.

The product slurry coming out of the centrifuge 102 will in general have a solids content (by weight) of from 20 to 25%. The product slurry from centrifuge 102 is passed to surge tank 126. The output of surge tank 126 is pumped by centrifugal pump 130 (FIG. 4) to the low solids process storage 134 where it is agitated by motor driven impeller 138.

The output of the low solids process storage 134 is pumped by centrifugal pump 140 to leaching column 142 where a plurality of motor driven paddles and impellers 146 stir and agitate the slurry during leaching. The leaching column and associated apparatus may be of any conventional design. Ozone in the amount of 1½ to 7 pounds per ton of dry calcium carbonate is mixed with the calcium carbonate. The ozone may be added to the slurry by being bubbled in through ozone injection ring 148, or similar conventional means of such introduction, from ozone generator 150 or other suitable ozone source.

The calcium carbonate entering the leaching column 142 may typically have a brightness or reflectance of 93% at 457 nm and may in some cases be as low as 83–87%. The product following leaching in column 142 may typically have a reflectance on the order of 95–97% at 457 nm.

Additionally the organic dispersant is oxidized, decomposed, deactivated or otherwise rendered non-dispersing by the ozone treatment destroying the dispersing effect of the organic dispersant.

As the output of the leaching column 142 is fed into feed tank 154 (as a result of the effect of ozone leaching on the dispersant), the product tends to settle, absent agitation. Agitation may be provided by motor driven impeller 153.

The output of feed tank 154 is pumped by centrifugal pump 158 (FIG. 5) to a constant head feed tank 162.

The overflow 164 from constant head feed tank 162 is returned to feed tank 154.

The flow from the constant head feed tank 162 is directed to the dewatering centrifuge 168 which may preferably be a DeLavel NX 418 centrifuge operated at 3000 G's.

Optionally, the slurry and/or centrifuge 168 may be heated to 140°–160° F.

Further, a nonionic polymer such as PERCOL 351 may optionally be added in an amount from 0.25 to 0.5 pound per ton of dry calcium carbonate from flocculant dispenser 177 to flocculate the calcium carbonate further as it enters the centrifuge 168 where it is dewatered. It is a feature of the invention that the flocculant is added at the mouth of the centrifuge.

A dispersant such as approximately 0.2 to 0.4% of DISPEX N40 on a dry basis may be added from dispersant dispenser 175 to the underflow solids discharge to assist in the removal of the 65 to 69% solids from the dewatering centrifuge.

The underflow solids are removed as underflow stream 170 from dewatering centrifuge 168 and agitated in underflow tank 172 by motor driven impeller 176 operated with a tip speed on the order of 3000 to 4000 feet per minute.

The overflow 178 of the dewatering centrifuge 168 is passed to overflow tank 180 and thence pumped by centrifugal pump 182 to makedown tank 38 and/or centrifuge underflow tank 116. Although the stream is largely water, it may contain up to about 1% solids by weight.

The underflow from the underflow tank 172 is pumped by centrifugal pump 196 to the high solids slurry storage tanks 198 where it is agitated by motor driven impeller 202.

The output of the high solids slurry storage tank 198 may be pumped by centrifugal pump 206 to either spray dryer 208 or to the high solids slurry makedown tank 210.

That product which is spray dried in spray dryer 208 is then moved by a Fuller-Kinyon Pump 216 to the product dry bulk storage 218.

The dry bulk product storage 218 may be used to provide product for dry product shipping 220 or moved by screw conveyor 222 to the high solids slurry makedown tank 210.

That product in the high solids slurry makedown tank 210 may be further transported for slurry storage 224 or for slurry shipment 226.

As used herein, the term Fuller-Kinyon Pump refers to the dry material hopper, the screw conveyor, the flap gate and the high pressure air system which collectively make up the pump.

All pumps, tanks, conveyors, material handling systems and the like are conventional and any suitable equivalents may be employed.

The various components of the invention referred to throughout as the preferred embodiments of the present invention are believed to constitute the best mode of the present invention but a variety of other suitable means may of course be employed to the same ends as in substitution with attendant changes in modes of operation.

In general, the raw materials of the present process may be made down as a slurry on the order of 15 to 60% by weight of solids. Somewhat faster grinding is obtained when the slurry contains less than about 40% by weight solids. At higher slurry solids the grinding rate drops off to an extent which may tend to offset the increased production resulting from the greater amount of solids in the grinding chamber under such conditions. Thus, a solids content on the order of 30% by weight solids may be preferred for most operations.

The attrition mill(s) may be operated with a media/slurry ratio of from about 40:60 to 60:40 by volume. While in general the rate of grinding increases as the volume of media to volume of slurry increases, a 55:45 media/slurry ratio may be preferred as giving a high rate of grinding with good flow in the mill.

The glass or ceramic beads may be within the range of approximately 8 to 50 mesh bead size. Beads of from 20 to 30 mesh bead size are preferred as providing the desired compromise between impact intensity, which is greater with the larger and heavier beads and frequency of impact which is greater with the more numerous smaller beads.

The retention time within the attrition mill may be from 5 to 60 minutes. For most raw materials and desired products, a retention time of from 15 to 40 minutes will be sufficient with from about 20 to 30 minutes preferred. In general, little further increase in fineness is found to occur after about 40 minutes and such as does occur proceeds at a relatively slow rate.

The ozonation described above may be carried out for a period of from 10 minutes to 1½ hours depending on the raw materials and the desired brightness level. As disclosed herein from 1.5 to 7 pounds of ozone per tone of dry calcium carbonate is generally sufficient to produce the desired brightness level. Of course more ozone may be employed if necessary or desired for a given retention time within the column.

Low temperature spray drying (less than 700° F.) may be employed in connection with the present invention.

As noted herein above, the preferred dispersing agent is a water-soluble salt of a polyacrylic or polymethacrylate acid such as DISPEX N40 produced by Allied Colloids, Inc. Other similar dispersing agents such as ALCOSPERSE, D-FLOC, and COLLOIDS may also be employed. Other dispersing agents such as water-soluble salts of polyphosphoric acid, water-soluble salts of polysilicic acid, dinapththylmethane sulphonates, sodium salts of the sulphonated condensation products of naphthalene and formaldehyde, lignosulphonates and alignates may be used alone or in conjunction with the preferred sodium, potassium or ammonium salts of polyacylic acid and of polymethacrylic acids. Dispersing agents such as tetrasodium pyrophosphate, sodium hexametaphosphate and sodium tripolyphosphate may also be employed in conjunction with the preferred dispersing agents.

Flocculants which may be employed in the present invention include electrolytes containing calcium or aluminum ions, such as calcium chloride, aluminum sulphate and calcium hydroxide, subject to the limitations herein noted, and nonionic polymers such as PERCOL 351 polyamide flocculating polymer.

The following examples are presented to illustrate the invention but the invention is not considered as limited thereto. In the examples and throughout the specification, parts are by weight unless otherwise indicated.

EXAMPLE I

A West Central Illinois coarse, dry, ground calcium carbonate was made down into a 30% by weight solids slurry dispersed with 0.2% (dry basis) of DISPEX N40. The slurry was subjected to bead grinding and classified in accordance with the teachings of the present invention to a product 85% finer than 2 microns. The product from the centrifuge was subjected to ozonation in a leaching column under rapid agitation with the addition of ozone at the rate of 5 pounds per ton of dry calcium carbonate for 30 minutes. The following increases in brightness were noted:

| Sample | Elrepho Brightness, % 457 nm | |
|---|---|---|
|  | Prior to Ozonation | After Ozonation |
| A | 92.3 | 95.0 |
| B | 93.6 | 96.0 |
| C | 93.9 | 96.0 |
| D | 94.3 | 95.9 |

EXAMPLE II

The process of Example I was repeated with the following changes in the ozone treatment level:

| Sample | Ozone Treatment Level Pounds/Ton of CaCO3 | Elrepho Brightness, % 457 nm |
|---|---|---|
| A-1 | 0 | 93.6 |
| A-2 | 5 | 96.0 |
| B-1 | 0 | 93.9 |
| B-2 | 1.5 | 95.6 |
| B-3 | 3 | 95.9 |
| B-4 | 5 | 96.0 |
| B-5 | 7 | 96.2 |

It will be noted from the above examples that the ozone treatment of the present invention significantly increases the brightness of the ultrafine ground limestone.

It is further to be noted that the recycling of coarse material from the classifying centrifuge decreases the grinding time and/or the energy requirements by as much as a factor of two as compared with holding the material in the grinding mill until the batch is uniformly 70-90% finer than 2 microns. The process of the present invention including the recycling concept as applied herein provides a means of tailoring and controlling the particle size as well as the particle size distribution. In addition, the process of the present invention prevents the unnecessary and energy wasteful overgrinding of the material and the production of extreme and/or excess fines.

Thus, in operation, a dry feed stone is slurried to a 15 to 60% by weight solids slurry and dispersed with an organic dispersant. The dispersed slurry is fed to an attrition mill where it is bead ground. The ground calcium carbonate is classified in a centrifuge into a product stream having from 70-99% of its particles less than 2 microns and an underflow stream of larger particles which is recycled for regrinding. The product stream is leached by ozone which serves not only to increase the brightness of the product but to return the slurry to a non-dispersed state. The calcium carbonate slurry is then fed to a dewatering centrifuge to produce a 65-69% solids product suitable for preparing a high solids slurry or for spray drying.

While the present invention has been described with reference to specific embodiments, this application is intended to cover those various changes and substitutions which may be made by those skilled in the art without departing from the spirit and scope of the appended claims.

What is claimed is:

1. A process for the production of ultrafine ground calcium carbonate having a brightness of 95-97% at 457 nm and wherein up to 90% of the particles are less than about 2 microns in size, said calcium carbonate being suitable as a white filler or coating for paper, the process comprising the steps of:
   (a) providing a dry crushed calcium carbonate to be slurried;
   (b) slurrying said calcium carbonate with water at a constant rate in a slurry tank to produce about a 15-60 weight percent solids slurry;
   (c) dispersing said slurry by adding a polyacrylate dispersant thereto in an amount of about 0.2 to 0.4 weight percent, said dispersant being susceptible to being destroyed by ozone;
   (d) bead grinding said dispersed slurry in an attrition mill containing about 40 to 60 percent by volume of beads for a sufficient time for the output product slurry of said attrition mill to compromise particles of calcium carbonate having a size wherein about 50 to 70 percent by weight are less than 2 microns;
   (e) removing said output product from the attrition mill to a classifying centrifuge, adding a flocculent to the output product, and classifying the output product of said attrition mill at an elevated temperature into a product stream having 70 to 90 percent by weight of its particles of a size less than 2 microns, and an underflow stream of predominately larger particles;
   (f) contacting said output product with about 1.5 to 7 pounds of ozone per ton of dry calcium carbonate contained in said output product for about 10 minutes to 1.5 hours to brighten said calcium carbonate and under conditions sufficient to destroy any dispersant, flocculent, organic matter or microorganisms contained in the mixture and return the product to a non-dispersed state; and
   (g) dewatering the product resulting from treatment with the ozone to produce a calcium carbonate mixture having a solids content of about 65 to 769 percent by weight and a brightness of 95-97% at 457 nm, and process liquids.

2. A process according to claim 1 wherein the output product from the attrition mill is passed through a screen having a size of about 80 to 150 mesh prior to classification.

3. A process according to claim 1 wherein sufficient steam is present during the classification process to maintain a temperature in the range of about 140° F.

4. A process according to claim 1 wherein the dewatering in step is carried out in a dewatering centrifuge to separate a product as 65 to 66 weight percent solids and the water containing some solids is recycled to the slurry tank for regrinding and processing.

5. A process according to claim 4 wherein dry spray dried calcium carbonate is added to the 65 to 66 weight percent solids product to raise the solids content of the product to about 70 percent.

6. A process according to claim 1 wherein said initial slurry of calcium carbonate has a solids content on the order of 30 percent by weight.

7. A process according to claim 1 wherein said dispersed slurry is ground in said attrition mill for a period of time on the order of 30 minutes with 20 to 30 mesh glass beads which occupy 55 percent by volume of said attrition mill.

8. A process according to claim 1 wherein the calcium carbonate solids are spray dried to provide a dry spray dried product.

* * * * *